United States Patent [19]

Engels et al.

[11] Patent Number: 5,438,732
[45] Date of Patent: Aug. 8, 1995

[54] HINGE JOINT FOR THE SEATS OF VEHICLES AND THE LIKE

[75] Inventors: Bernd Engels, Remscheid; Hans-Jürgen Funken, Wuppertal; Hans-Gerd Hackländer, Remscheid, all of Germany

[73] Assignee: Keiper Recaro GmbH. & Co., Remscheid, Germany

[21] Appl. No.: 99,720

[22] Filed: Jul. 29, 1993

[30] Foreign Application Priority Data

Aug. 24, 1992 [DE] Germany ............... 42 28 054.0

[51] Int. Cl.⁶ .............. E05D 11/08; E05D 11/10; B60N 2/22
[52] U.S. Cl. ...................... 16/325; 16/337; 74/DIG. 10; 297/362
[58] Field of Search ............. 297/362, 357.12; 74/DIG. 10; 16/324, 325, 337, 341, 349

[56] References Cited

U.S. PATENT DOCUMENTS

| | | | |
|---|---|---|---|
| 4,453,767 | 6/1984 | Walk et al. | 16/236 |
| 4,563,039 | 1/1986 | Jörg | 297/362 |
| 4,773,704 | 9/1988 | Engels | 297/362 |
| 4,828,322 | 5/1989 | Walk | 297/362 |
| 4,836,607 | 6/1989 | Kluting | 16/341 |
| 4,916,962 | 4/1990 | Tsutsumi et al. | 74/392 |

FOREIGN PATENT DOCUMENTS 1170708 11/1969 United Kingdom.
1280101 7/1972 United Kingdom.

Primary Examiner—Lowell A. Larson
Assistant Examiner—Donald M. Gurley
Attorney, Agent, or Firm—Darby & Darby

[57] ABSTRACT

A hinge joint for use in the seats of motor vehicles to permit changes of inclination of the back rest has a first leaf secured to the body supporting portion of the seat, a second leaf secured to the back rest and a composite shaft having an eccentric cylindrical portion turnably mounted in the first leaf and two coaxial conical portions flanking the eccentric portion and turnably mounting the second leaf. At least one conical portion has a cylindrical core of a metallic material and elastic sleeve surrounding the core and having a conical external surface. A diaphragm spring reacts against the shaft and urges the second leaf axially of the shaft against the first leaf, and a spur gear of the first leaf mates with an internal gear of the second leaf.

14 Claims, 3 Drawing Sheets

HINGE JOINT FOR THE SEATS OF VEHICLES AND THE LIKE

BACKGROUND OF THE INVENTION

The invention relates to hinge joints in general, and more particularly to improvements in hinge joints which can be utilized with advantage in seats of vehicles, for example, in the drivers' seats of motor vehicles.

Commonly owned U.S. Pat. No. 4,828,322 granted May 9, 1989 to Hansjörg WALK et al. for "Hinge joint for the seats of automotive vehicles and the like" discloses a hinge joint which can be used to change the mutual positions of two portions of a seat, e.g., the position of the back rest relative to the body supporting portion of a driver's seat in a motor vehicle. The patented hinge joint comprises first and second components which can be affixed to the body supporting portion and the back rest, respectively, and a device which pivotally connects the two components to each other and includes a shaft defining a pivot axis and including a cylindrical first portion which is journalled in one of the components, and first and second conical portions constituting fulcra for the other component. The first portion has an axis which is parallel to the pivot axis and the conical portions have a common axis which coincides with the pivot axis. The patented hinge joint further comprises resilient means (e.g., a diaphragm spring) reacting against one of the components and biasing the coupling member in the direction of the pivot axis. Still further, the patented hinge joint comprises means (e.g., a spur gear and a mating internal gear) for releasably holding the components in selected angular positions relative to each other.

The shaft of the patented hinge joint is of one piece which contributes to its cost. Thus, the two conical portions and the cylindrical first portion of such shaft must be made of a single one-piece blank of high-quality metallic material. This contributes significantly to the cost of the shaft and of the entire hinge joint. In addition, the shaft must be machined with a very high degree of accuracy because the advantages (such as the elimination of radial play and adjustment with the exertion of a relatively small force) can be achieved only if the component parts, and particularly the shaft and the parts which are rotatably mounted on the shaft, of the patented hinge joint are machined and/or otherwise finished with negligible tolerances.

The disclosure of the patent to Walk et al. is incorporated herein by reference.

OBJECTS OF THE INVENTION

An object of the invention is to provide an inexpensive coupling member for use in a hinge joint of the above outlined character.

Another object of the invention is to provide a hinge joint which embodies the improved coupling member.

A further object of the invention is to reduce the cost of a hinge joint for use in motor vehicles and the like.

An additional object of the invention is to provide an inexpensive hinge joint without reducing its quality.

Still another object of the invention is to considerably reduce the cost of the hinge joint which is patented to Walk et al. without eliminating any of its advantages.

A further object of the invention is to provide the shaft of the above outlined hinge joint with at least one simple and inexpensive but long-lasting bearing element for one component of the structure wherein or in combination with which the hinge joint is put to use.

SUMMARY OF THE INVENTION

The invention is embodied in a hinge joint which can be utilized with particular advantage as a means for changing the mutual positions of two portions of a seat, e.g., the driver's seat in a motor vehicle. The improved hinge joint comprises first and second components (one of these components can be affixed to the body supporting part of a seat and the other component can be connected to the back rest of such seat), and means for pivotally connecting the two components to each other. The connecting means comprises a cylindrical first portion which is journalled in the first component and first and second conical portions which are journalled in the second component. The first portion has a first axis and the conical portions have axes which are parallel to the first axis. In accordance with a feature of the invention, at least one of the conical portions comprises a metallic core and a hollow conical sleeve which surrounds the core. The hinge joint can further comprise resilient means reacting against one of the components to bias the connecting means in the direction of the aforementioned axes, and means for releasably holding the two components in selected angular positions relative to each other.

The core can include a cylinder and the sleeve can include, or can consist of, a plastic material. For example, the sleeve can constitute an extrusion.

The core can include a cylinder having a profiled peripheral surface, and such peripheral surface can be provided with at least one annular groove.

The sleeve can be of one piece with a driving member including a toothed gear at least a portion of which surrounds the core. The at least one conical portion can be coaxial with the other conical portion, and the core can be coaxial with the first portion of the connecting means.

The maximum outer diameter of the at least one conical portion can exceed the maximum outer diameter of the other conical portion.

The sleeve can be of one piece with a tubular extension, and the aforementioned toothed gear can be disposed between the sleeve and the extension.

The novel features which are considered as characteristic of the invention are set forth in particular in the appended claims. The improved hinge joint itself, however, both as to its construction and its mode of operation, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
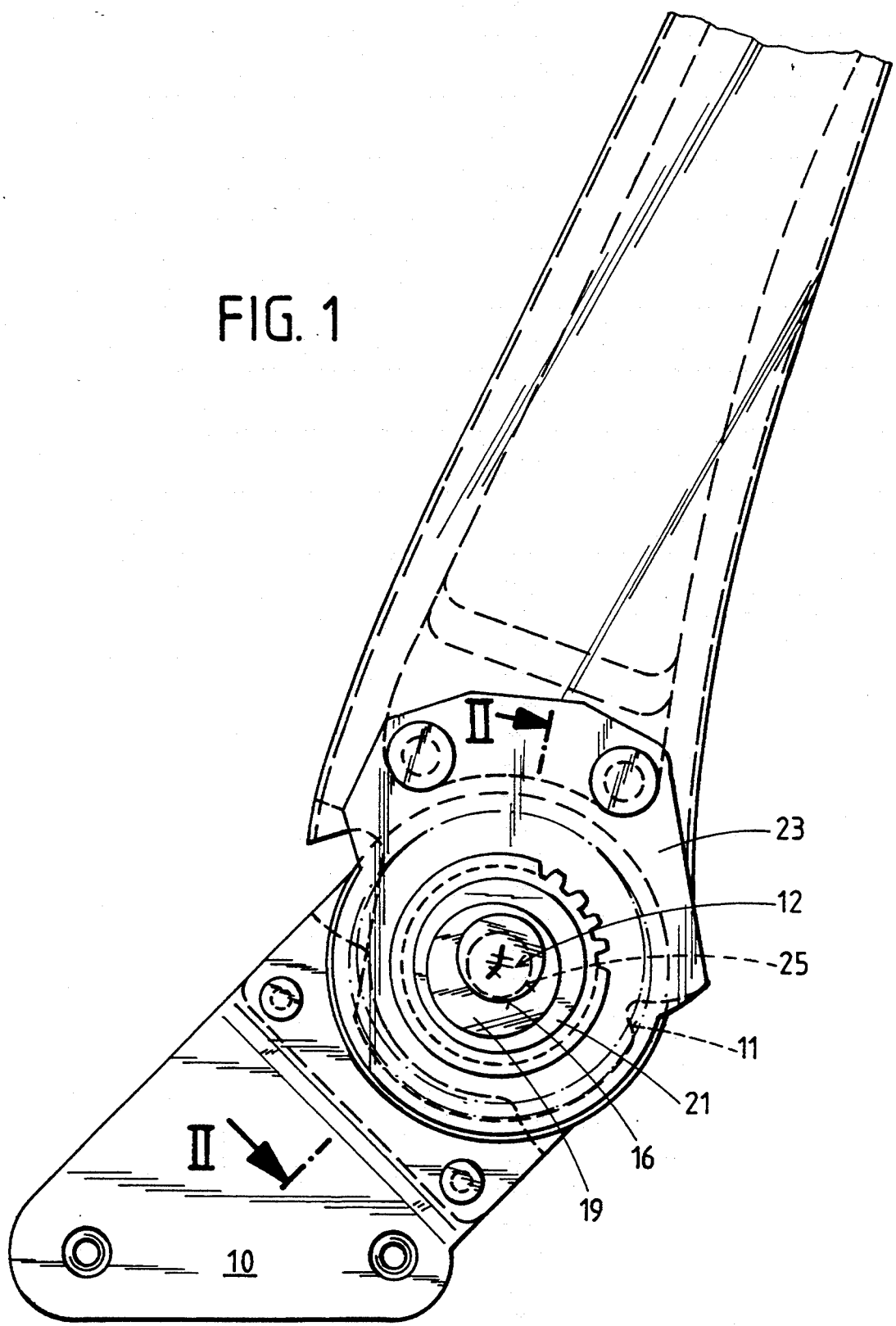
FIG. 1 is a side elevational view of a hinge joint which embodies one form of the invention.
Figure 2:
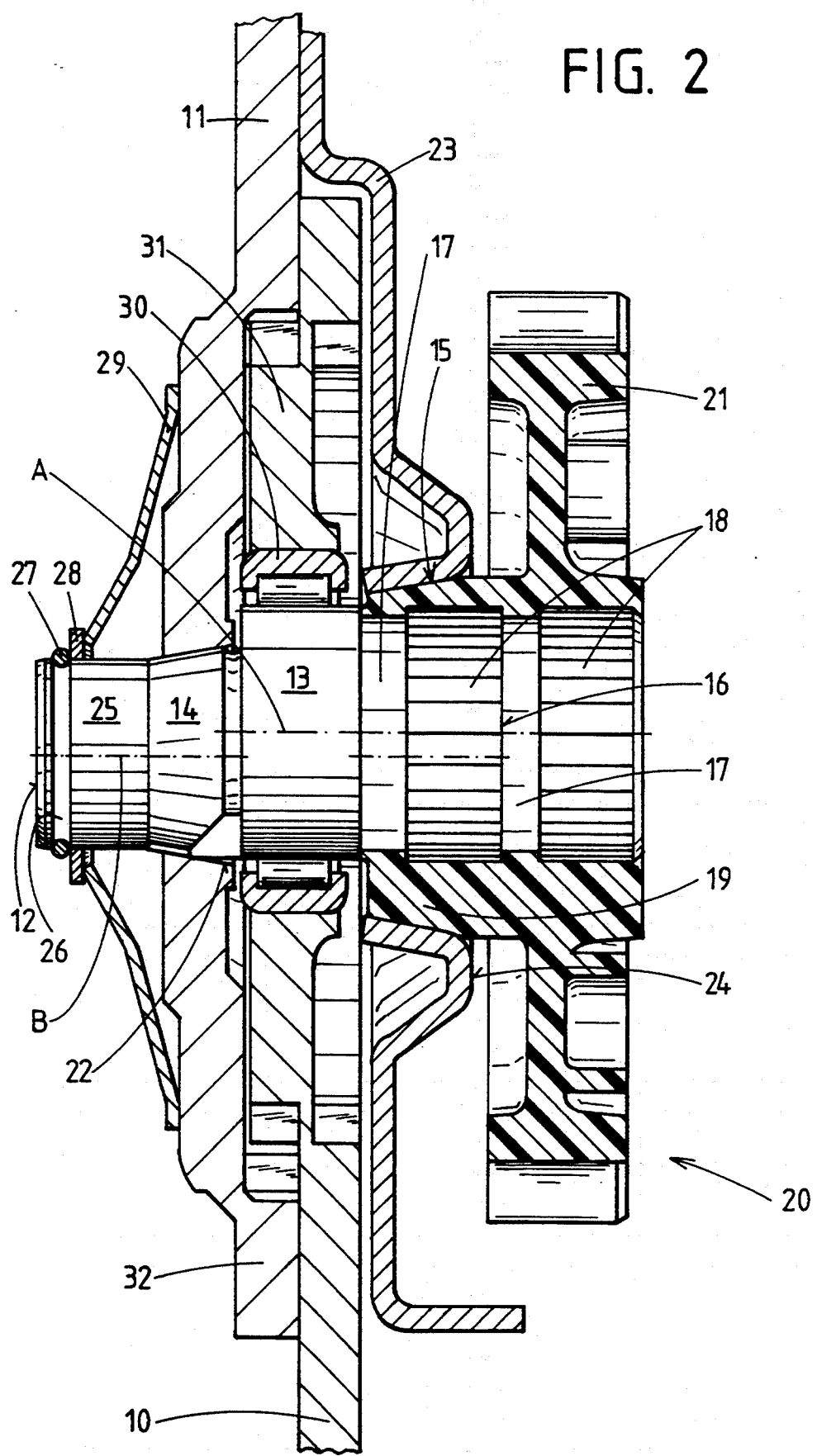
FIG. 2 is an enlarged sectional view as seen in the direction of arrows from the line II—II in FIG. 1.

Referring first to FIGS. 1 and 2, there is shown a hinge joint having a first component or leaf 10 connectable to the body supporting portion of a seat (e.g., the driver's seat in a motor vehicle) and a second component or leaf 11 connectable to the back rest of a seat. The means for pivotally connecting the component 11 to the component 10 comprises an elongated coupling member 12 here shown as a composite shaft having an eccentric cylindrical first portion 13 which is rotatably journalled in the first component 10 and two conical second portions 14, 15 which are coaxial with the shaft 12 and parallel to the axis A of the cylindrical portion 13. The common axis B of the conical portions 14, 15 is parallel to the axis A and the distance between the axes A, B denotes the eccentricity of the conical portions 14 and 15. The conical portion 14 is rotatably journalled in a bearing 30 within a spur gear 31 which is of one piece with the component 11, and the conical portion 15 is rotatably journalled in a metallic closure or cover 23 of the component 11.

In accordance with a feature of the invention, the shaft 12 is not of one piece with the entire conical portion 15. Instead, the conical portion 15 includes a cylindrical or nearly cylindrical portion or core 16 which is coaxial with the shaft 12, and a sleeve-like section 19 made of an elastomeric material and mounted on the core 16 in such orientation that it is coaxial with the conical portion 14 and with the major portion of the shaft 12.

The cylindrical portion 13 is located between (i.e., it is flanked by) the conical portions 14, 15. The maximum diameter of the illustrated conical portion 14 is smaller than the maximum diameter (and also the minimum diameter) of the conical portion 15, i.e., the outer diameter of the sleeve-like section 19 (hereinafter called sleeve). The diameter of the metallic core 16 of the conical portion 15 is greater than the maximum diameter of the conical portion 14 and can equal or approximate the diameter of the cylindrical portion 13. The material of the metallic core 16 is or can be identical with the material of the cylindrical portion 13, the conical portion 14 and an end portion or stub 25 of the shaft 12.

The peripheral surface 18 of the generally cylindrical core 16 is profiled so that it can be nonrotatably surrounded and engaged by the sleeve 19, and the peripheral surface 18 has two axially spaced apart circumferentially complete grooves 17. One of these grooves is adjacent the cylindrical portion 13 and the other groove 17 is disposed substantially midway between the axial ends of the core 16. The peripheral surface 18 of the core 16 can be profiled by roughening, by the provision of one or more splines, by the provision of one or more teeth and/or in any other suitable way. The sleeve 19 is or can constitute an extrusion which snugly surrounds the core 16 and thus shares all angular movements of the shaft 12. The illustrated sleeve 19 can be made of any suitable plastic material and is assumed to have been extruded directly onto the core 16 so that it fills the two grooves 17. The eccentricity of the conical external surface of the sleeve 19 is the same as that of the conical portion 14. Thus, and as already stated above, the axis B of the conical portion 15 coincides with the axes of the conical portion 14 and stub 25 and is parallel to the axis A of the cylindrical portion 13 of the shaft 12.

The illustrated sleeve 19 is of one piece with a driving member 20 including a spur gear 21 which surrounds the right-hand portion of the core 16 (as viewed in FIG. 2). The gear 21 can receive torque from a prime mover (e.g., a motor, not shown) or from a transmission of a manual adjusting unit for the angular position of the component 11 relative to the component 10.

The main portion of the second component 11 has a conical bore or hole 22 which surrounds and rotatably engages the conical peripheral portion of the portion 14. The closure or cover 23 is affixed to the second component 11 and has a conical collar 24 which engages and rotatably surrounds the conical peripheral surface of the sleeve 19. A substantial portion of the first component 10 is located between the main portion and the closure or cover 23 of the second component 11.

The stub 25 of the shaft 12 is outwardly adjacent the conical portion 14 and has a circumferential groove 26 for a split ring 27 abutting a washer 28 which engages the radially innermost portion of a diaphragm spring 29. This spring reacts against the main portion of the second component 11 and pulls the shaft 12 in a direction to the left, as viewed in FIG. 2. Thus, the conical peripheral surface of the portion 14 is urged against the surface 22 of the main portion of the second component 11, and the conical peripheral surface of the sleeve 19 is urged against the internal surface of the collar 24 forming part of the closure or cover 23, i.e., of the second component 11. The illustrated diaphragm spring 29 can be replaced with one or more coil springs or with other suitable means for biasing the conical portions 14, 15 into the complementary conical portions of the component 11. All that counts is to ensure that the shaft 12 is biased axially so as to urge the two conical portions 14, 15 toward the minimum-diameter parts of the respective conical internal surfaces of the component 11. This eliminates undesirable radial play when the angular adjustment of the component 11 relative to the component 10 is completed. Reference may be had again to the disclosure of the commonly owned patent to Walk et al.

The bearing 30 can constitute a needle bearing, a ball bearing or any other suitable bearing as disclosed by Walk et al. This bearing is installed between the cylindrical portion 13 and the radially innermost portion of the spur gear 31 forming an axially offset integral part of the component 10 and mating with the axially offset internal gear 32 of the component 11. The number of teeth on the internal gear 32 exceeds, at least by one, the number of teeth on the spur gear 31, and the ratio of the diameter of the addendum circle of the internal gear 32 to the diameter of the dedendum circle of the spur gear 31 is such that the difference at least equals the radial dimension of one tooth of the internal gear 32. The construction of the means (including the gears 31, 32) for releasably holding the component 11 in a selected angular position relative to the component 10 is or can be the same as disclosed in commonly owned U.S. Pat. No. 4,563,039 granted Jan. 7, 1986 to Horst Jörg for "Hinge joint for use in the seats of motor vehicles and the like". The disclosure of this patent is also incorporated herein by reference.

An important advantage of the improved hinge joint is that its shaft 12 can be produced at a fraction of the cost of a shaft of the type shown and described in the patent to Walk et al. This is due to the fact that the conical portion 15 of the improved shaft 12 includes a cylindrical metallic core (16) and a plastic sleeve (19) surrounding and being preferably formed directly on the core. The peripheral surface 18 of the core 16 need not be machined or otherwise treated with any degree of precision because the conical external surface which engages the collar 24 of the closure or cover 23 of the second component 11 is provided on the sleeve 19.

Thus, when making the metallic part of the shaft 12, it suffices to accurately finish the portions 13, 14 but not the cylindrical core 16. Profiling of the peripheral surface 18 of the core 16 ensures reliable engagement with the sleeve 19. Such profiling ensures that the sleeve 19 and the core 16 cannot turn relative to each other. The groove or grooves 17 ensure that the sleeve 19 and the core 16 and held against axial movement relative to each other.

The gear 21 can be replaced with a handwheel or a like manually operable device if the angular position of the component 11 relative to the component 10 is to be changed only by hand. A handwheel is shown in the aforementioned patent to Jörg as well as in commonly owned U.S. Pat. No. 4,773,704 granted Sep. 27, 1988 to Bernd Engels for "Apparatus for adjusting the seats of motor vehicles" and incorporated herein by reference. This gear is needed primarily or exclusively if the component 11 is not readily accessible, if the shaft 12 is not readily accessible and/or when the maker of the hinge joint desires to provide a motor or another prime mover as a means for adjusting the inclination of the component 11 relative to the component 10.

Conventional means for changing the inclination of one of the two components relative to the other component normally comprise a device which must be nonrotatably mounted on the one component and is held against axial movement relative thereto. The illustrated gear 21 is made of one piece with the sleeve 19 so that it is normally held against rotation relative to the component 11 by the spring 29. The material of the gear 21 is or can be the same as that of the sleeve 19.

The feature that the core 16 of the conical portion 15 is coaxial with the conical portion 14 and stub 25 also contributes to lower cost of the composite shaft 12. Furthermore, the feature that the diameter of the conical surface of the sleeve 19 is larger than the diameter the conical portion 14 (i.e., that the two-piece conical portion 15 is larger than the other conical portion 14 which is of one piece with the portions 13, 24, 16 of the shaft 12) also contributes to lower cost of the shaft and to lower cost of the making and application of sleeve 19 around the profiled core 16.

The closure or cover 23 and its collar 24 can be made of sheet metal. The closure can be strengthened against deformation by one or more stiffening ribs and/or in any other suitable way.

Figure 3:
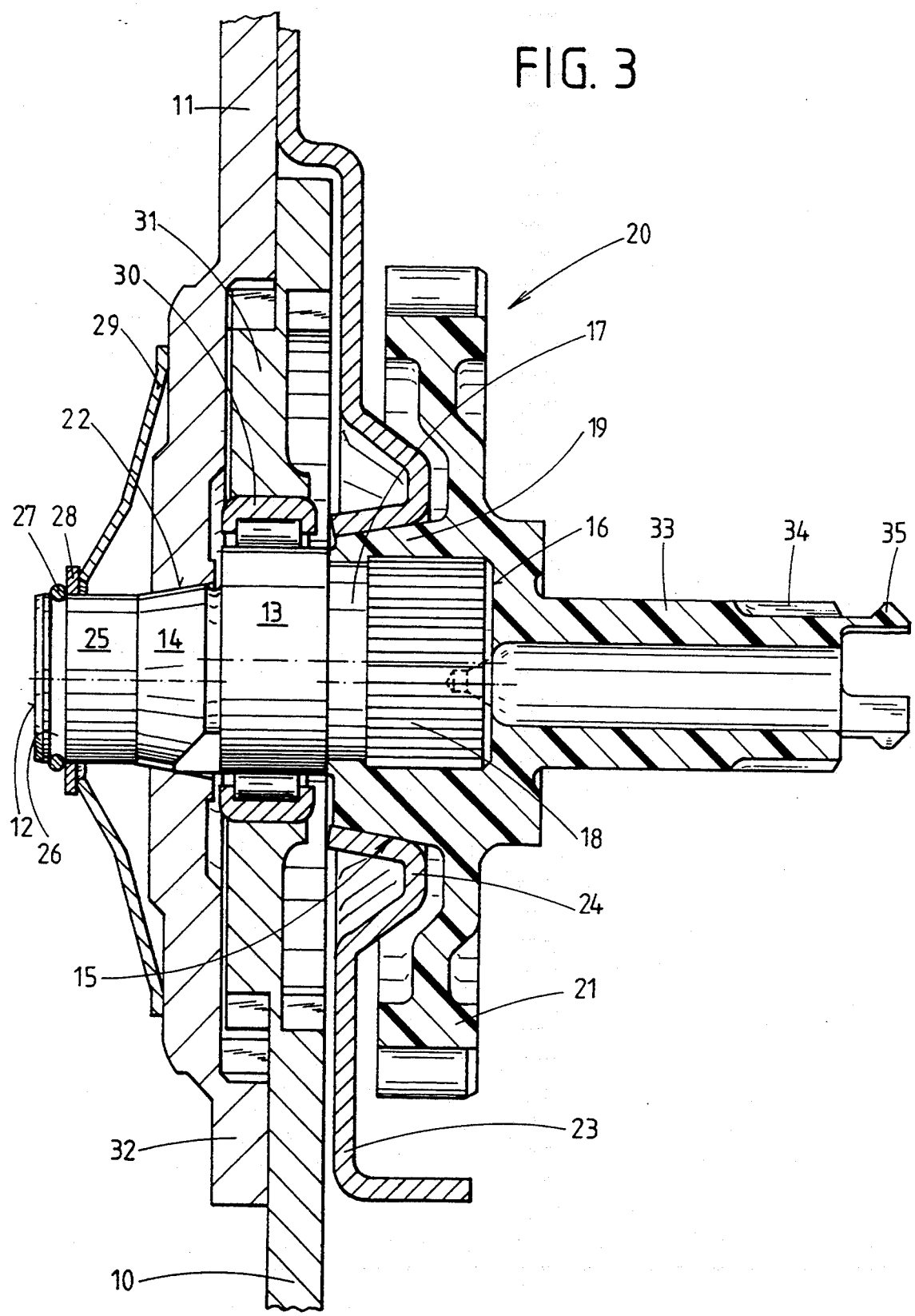
FIG. 3 is a sectional view similar to that of FIG. 2 but showing a modified hinge joint.

FIG. 3 shows a portion of a modified hinge joint. All such parts of this hinge joint which are identical with or clearly analogous to corresponding parts of the hinge joint of FIGS. 1 and 2 are denoted by similar reference characters. The main difference is that the sleeve 19 is of one piece with a tubular extension 33 which is coaxial with the gear 21. The latter is disposed between the sleeve 19 and the extension 33. Furthermore, the metallic core 16 of the conical portion 15 is relatively short and its peripheral surface 18 has a single groove 17. The extension 33 can serve as a means for supporting a closing spring brake (not shown). A brake, which can be connected to the extension 33 can be of the type disclosed and shown in DE-Pat. No. 975780 granted Aug. 9, 1962 to Fritz Keiper for Vorgelege für ienen Sitz non Kraftfahrzeugen. The locking element of the brake can enter one or more axially parallel grooves or flutes 34 in the external surface of the extension 33 to prevent rotation of the sleeve 19 relative to the brake. Axially extending resilient prongs 35 of the extension 33 maintain the brake in a predetermined axial position relative to the sleeve 19, driving member 20 and extension 33. All other parts of the hinge joint of FIG. 3 are or can be identical with the corresponding parts of the hinge joint of FIGS. 1 and 2.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A hinge joint, particularly for changing the mutual positions of two portions of a seat, comprising first and second components; means for pivotally connecting said components with each other, including a cylindrical first portion journalled in said first component and first and second conical portions journalled in said second component, said cylindrical first portion having a first axis and said conical portions having axes parallel to said first axis, said connecting means having a metallic core and at least one of said conical portions having a hollow conical sleeve surrounding said core; and resilient means reacting against one of said components to bias said connecting means in the direction of said axes.

2. The hinge joint of claim 1, further comprising means for releasably holding said components in selected angular positions relative to each other.

3. The hinge joint of claim 1, wherein said core includes a cylinder and said sleeve includes a plastic material.

4. The hinge joint of claim 3, wherein said sleeve is an extrusion.

5. The hinge joint of claim 1, wherein said core includes a cylinder having a profiled peripheral surface.

6. The hinge joint of claim 5, wherein said peripheral surface has at least one annular groove.

7. The hinge joint of claim 1, further comprising a driving member of one piece with said sleeve.

8. The hinge joint of claim 7, wherein said driving member comprises a toothed gear at least a portion of which surrounds said core.

9. The hinge joint of claim 1, wherein said at least one conical portion is coaxial with the other of said conical portions.

10. The hinge joint of claim 9, wherein said core is coaxial with said first portion of said connecting means.

11. The hinge joint of claim 1, wherein said at least one conical portion has a first maximum outer diameter and the other of said conical portions has a second maximum outer diameter smaller than said first outer diameter.

12. The hinge joint of claim 1, wherein said second component has a collar surrounding said at least one conical portion.

13. The hinge joint of claim 1, wherein said sleeve is of one piece with a tubular extension.

14. The hinge joint of claim 13, wherein said sleeve is of one piece with a gear which connects said sleeve to said extension.

* * * * *